March 20, 1928.

J. E. HUDSON

PAPER HOLDER

Filed Jan. 7, 1926

1,663,305

Inventor
James E. Hudson
By Wm. O. Belt Atty

Patented Mar. 20, 1928.

1,663,305

UNITED STATES PATENT OFFICE.

JAMES E. HUDSON, OF GALVA, ILLINOIS.

PAPER HOLDER.

Application filed January 7, 1926. Serial No. 79,753.

This invention relates to improvements in paper holders and its object is to provide a simple and inexpensive device for holding toilet paper or other goods and provided with means whereby it can be easily and conveniently secured to a wall or other support.

The invention is particularly adapted for holding a roll of toilet paper, but it can be used, in different sizes and with such modifications as may be necessary, for holding twine, tape, ribbon, wire and other goods and a further object is to provide a holder which can be moved about from place to place and easily secured to a support as and when desired.

A still further object is to provide a holder of strong and substantial construction which can be easily adjusted as to size so as to make it more readily adaptable for holding different kinds of goods.

In the accompanying drawings illustrating the invention,

Figure 1:
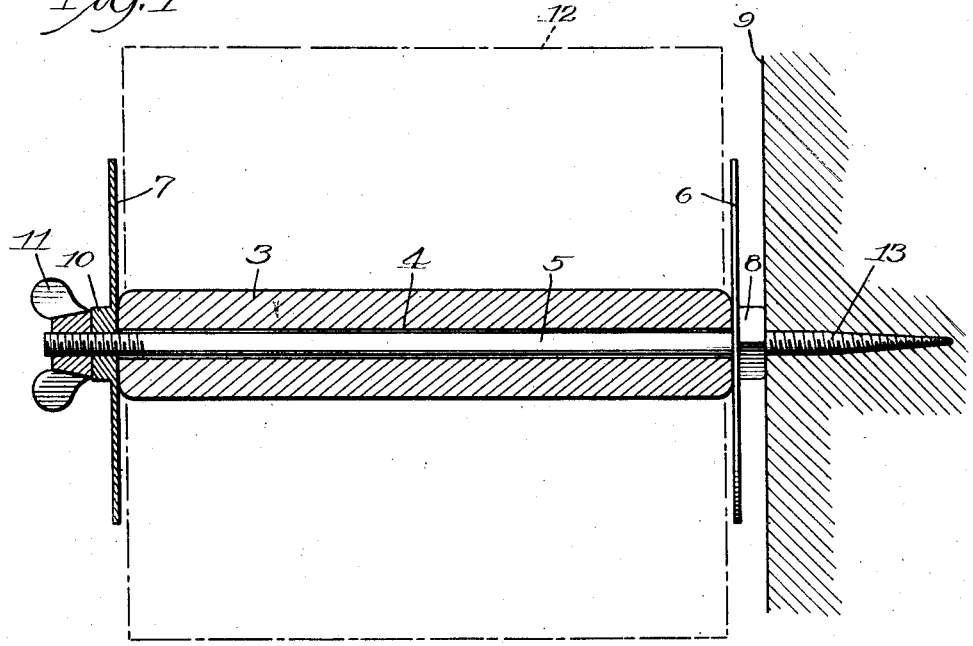
Fig. 1 is a sectional elevation showing the invention adapted for holding a roll of toilet paper.
Figure 2:
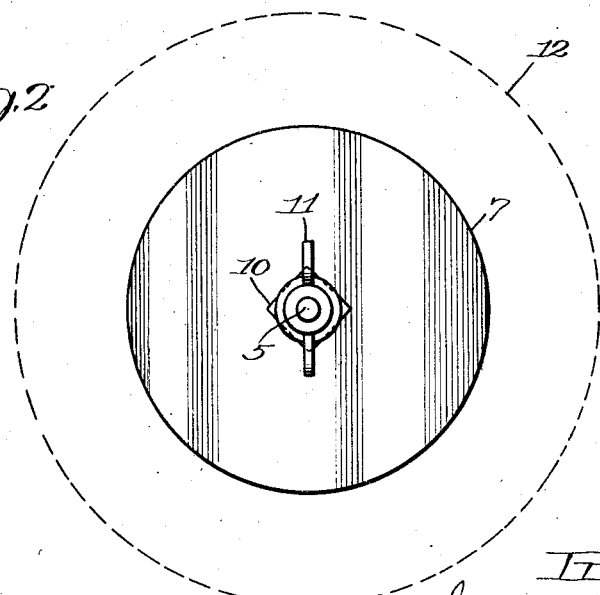
Fig. 2 is an end elevation.

Referring to the drawings, 3 is a core conveniently made of wood and provided with a central longitudinal bore 4 to receive a spindle 5. Disks 6 and 7 are mounted on the spindle at the ends of the core. The disk 6 is rigid with the spindle and a spacer 8 is rigid with the disk 6 and is located on the outer side thereof to space the holder from the wall or other support 9. I find it convenient to make the spacer 8 in the form of a nut and also to make this nut rigid with the disk 6, and also to make the nut and disk rigid with the spindle. The disk 7 is provided with a boss 10 on its outer side and is threaded to receive the spindle 5. A wing nut 11 is applied to the outer end of the spindle against the boss 10 to secure the parts rigidly in assembled position. I find it convenient to make the boss 10 in the form of a nut rigid with the disk 7, but this boss as well as the spacer 8 may be made in other shapes if desired. The wing nut 11 will hold the disk 7 in proper position on the spindle with relation to the disk 6 so that the core 3 will be permitted to revolve freely with its roll 12 within the disks. The end 13 of the spindle opposite the wing nut projects beyond the spacer 8 and is tapered and threaded to form a screw whereby the holder can be readily secured in place in any convenient position on a wall or other support. The spacer 8 is preferably made in the form of a nut so that a tool may be applied thereto for screwing the stem into the support, and for unscrewing it, but when the parts are all assembled and secured by the wing nut, it will be possible to screw the spindle into a support as well as to unscrew it, without the use of a tool, or by applying a tool to the boss 10, which may be more accessible than the spacer 8 for this purpose and which is also made nut shaped to receive a tool. The screw end 13 may be an integral part of the spindle 5, or it may be a separate part and secured rigidly to the spacer 8 and disk 6 which are in turn made rigid with the spindle. I may thread the spindle for the greater portion of its length to adapt it for receiving cores of different lengths, as may be required for different kinds of goods.

I have provided a holder for toilet paper and other goods of simple but substantial construction, which can be easily installed in any convenient place and used for a variety of purposes. The wing nut enables the device to be easily locked in its adjusted position to hold the parts rigidly and securely in place. The nut shaped spacer 8 and boss 10 provide means whereby a tool can be employed for screwing and unscrewing the threaded end 13 in a support.

As I have heretofore stated, it is my intention to adapt the invention for holding different goods and I am aware that it will be necessary or desirable in such cases to change the size and construction of the parts to adapt the holder for its different uses; therefore I reserve the right to make all such changes as fairly fall within the scope of the following claim.

I claim:

A holder of the class described, comprising a core having a bore therethrough, a spindle extended through said bore with one end threaded, an independent disk at one end of the core and having a threaded boss rigid therewith, an independent disk at the other end of the core and having a threaded spacer rigid therewith, and a lock nut on the threaded end of the spindle bearing against the boss of the adjacent disk for firmly securing the holder in place, the spindle being passed loosely through the bore of said core and having its other end provided with an elongated tapered thread for securing the holder in any desired position whereby the holder is supported solely by said spindle.

JAMES E. HUDSON.